United States Patent [19]
Frisch

[11] 3,817,029

[45] June 18, 1974

[54] ROCKET ENGINE

[75] Inventor: Erling Frisch, Pittsburgh, Pa.

[73] Assignee: Westinghouse Electric Corporation, Pittsburgh, Pa.

[22] Filed: Apr. 21, 1970

[21] Appl. No.: 34,917

[52] U.S. Cl.......................... 60/203, 176/39, 60/263
[51] Int. Cl. ............................................. G21d 1/00
[58] Field of Search ......... 60/203, 224, 263, 200 A; 176/39

[56] References Cited
UNITED STATES PATENTS

| | | | |
|---|---|---|---|
| 2,992,981 | 7/1961 | Thomson et al.................. | 60/224 X |
| 3,000,179 | 9/1961 | Samms............................. | 60/263 X |
| 3,170,287 | 2/1965 | Adelman........................... | 60/224 |
| 3,224,193 | 12/1965 | Loprete et al. ................... | 60/200 A |
| 3,372,547 | 3/1968 | Eberwine.......................... | 60/263 X |
| 3,436,253 | 4/1969 | Kelsey et al. .................... | 60/200 A |

FOREIGN PATENTS OR APPLICATIONS

| 74,261 | 3/1954 | Netherlands.......................... 60/224 |

OTHER PUBLICATIONS

Missles and Rockets, "Nuclear Engines Offer Good Stability," Frank G. McGuire, p. 29, 6-13-60.

Sutton, George P., Rocket Propulsion Elements, John Wiley and Sons, Inc., N.Y., 1963, pp. 398–401, 416, Patent Office Library.

Astronautics, "Advanced Reactor Concepts for Nuclear Propulsion," Frank E. Rom, pp. 20–21, October, 1959.

Primary Examiner—Carlton R. Croyle
Assistant Examiner—Robert E. Garrett
Attorney, Agent, or Firm—R. M. Saccocio

[57] ABSTRACT

A modular nuclear rocket engine is disclosed. Each module of the engine includes a plurality of relatively small-diameter pressure vessels each containing a plurality of fuel elements forming a nuclear core. The vessels are composed of low absorption cross section material. An individual exhaust nozzle is connected to each core to receive the propellant fluid which is heated by the core. Because each nozzle is relatively small it is formed of a high-temperature refractory material and is of simple structure having no cooling tubes. The modules are secured closely together to form a modular unit or engine of generally right-cylindrical configuration.

10 Claims, 19 Drawing Figures

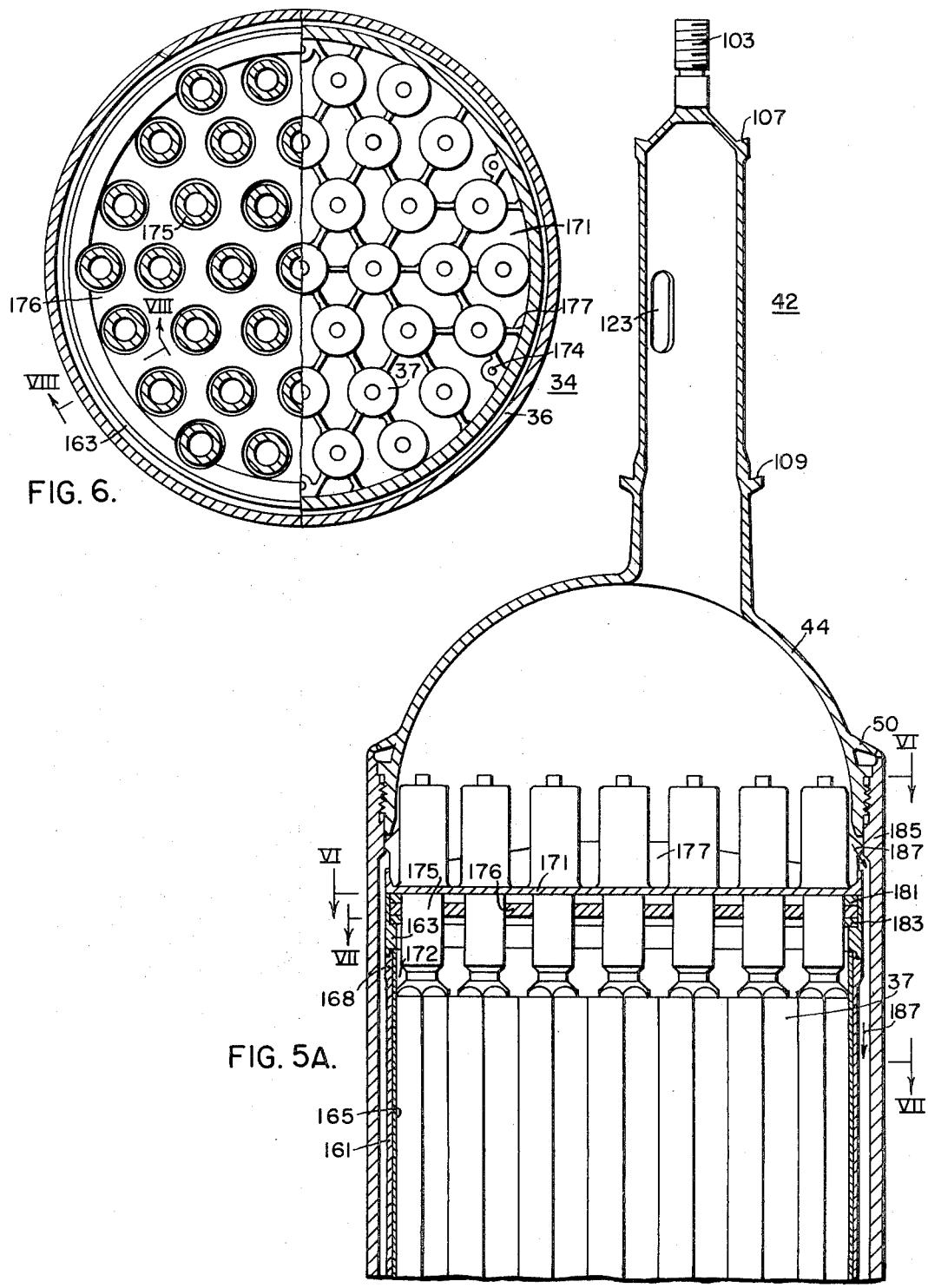

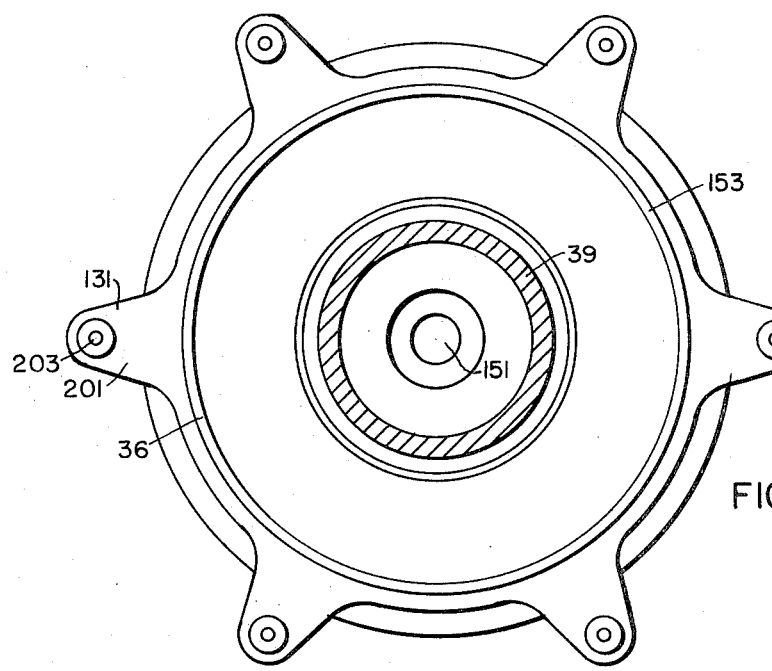
FIG. 9.
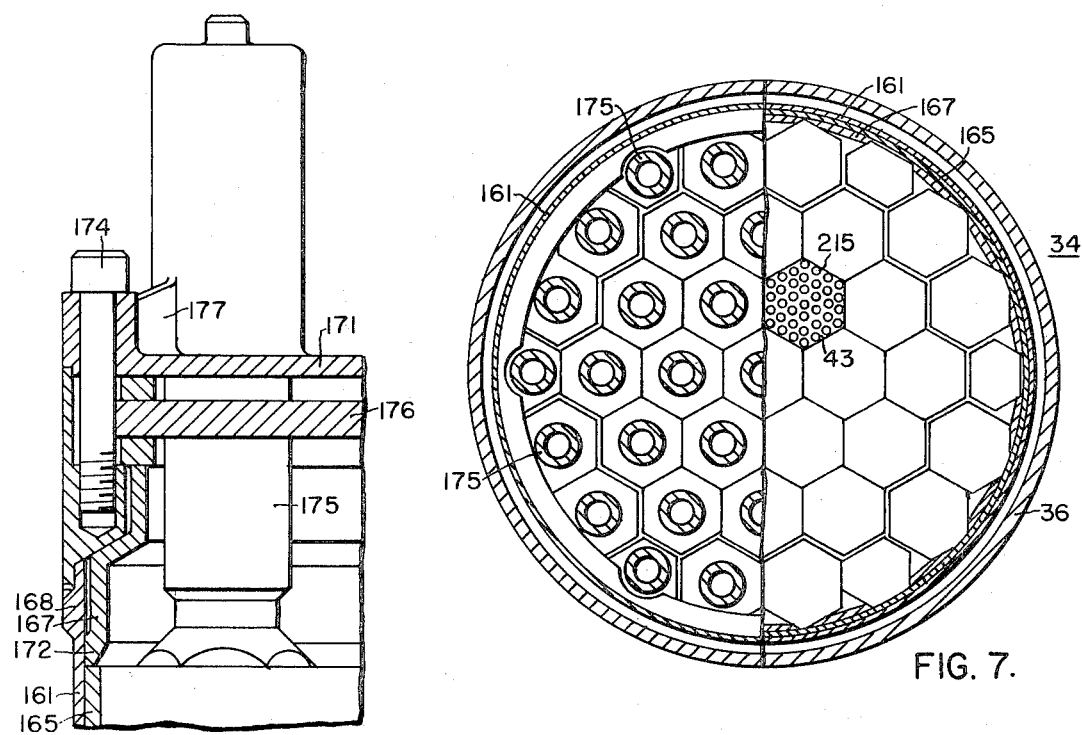
FIG. 8.
FIG. 7.

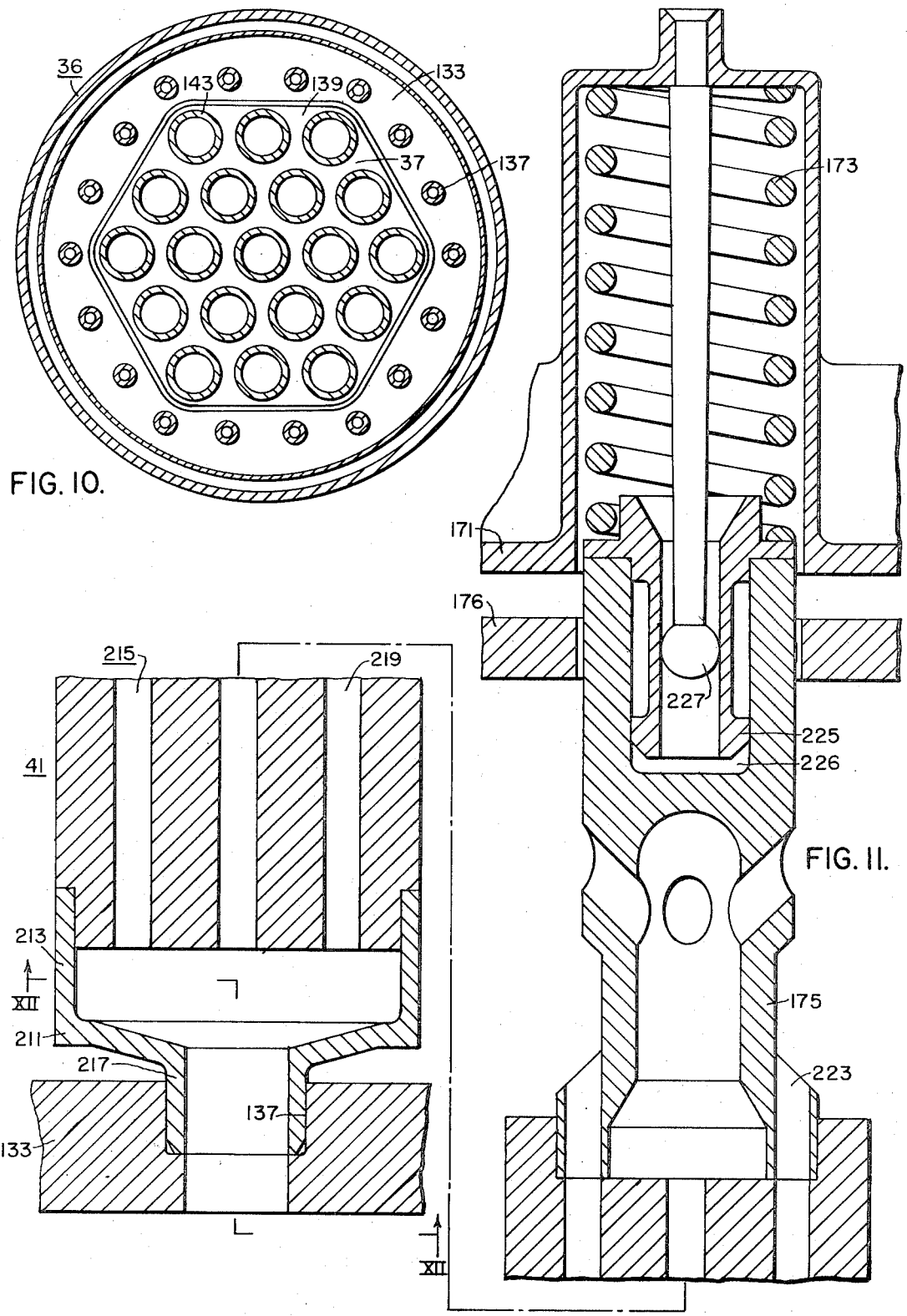

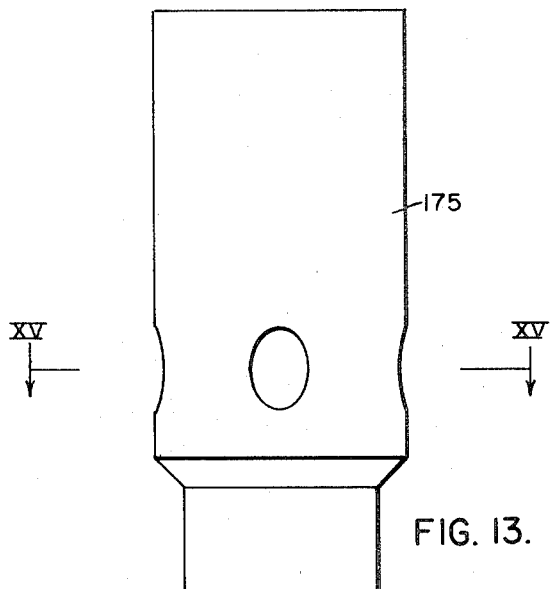
FIG. 13.
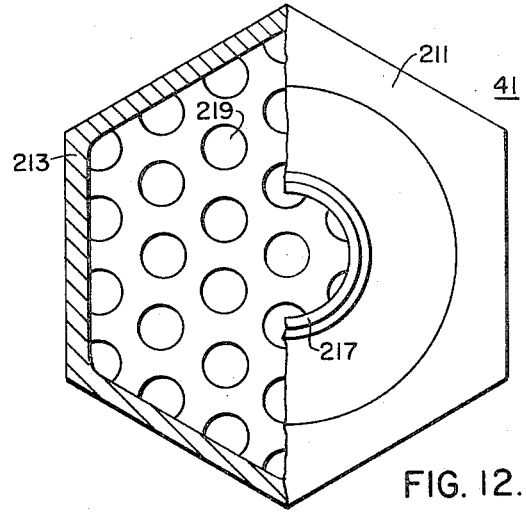
FIG. 12.
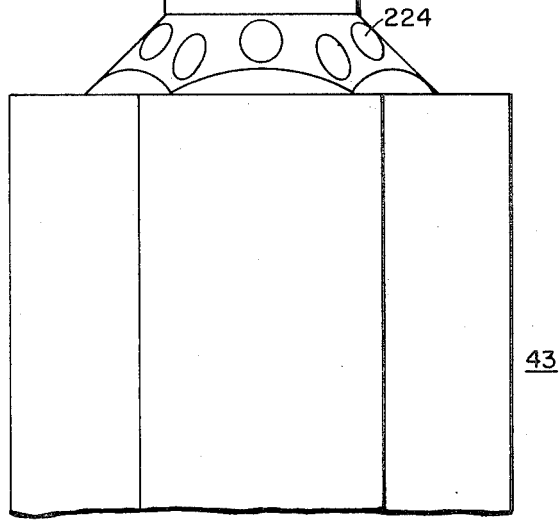
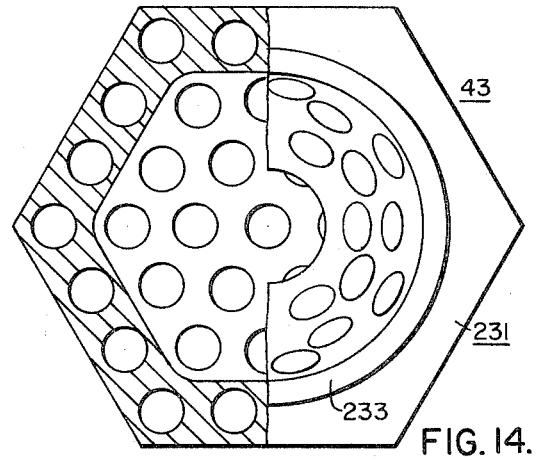
FIG. 14.
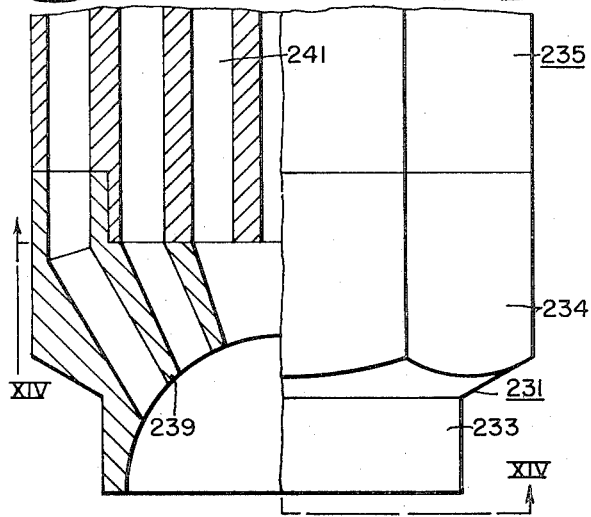
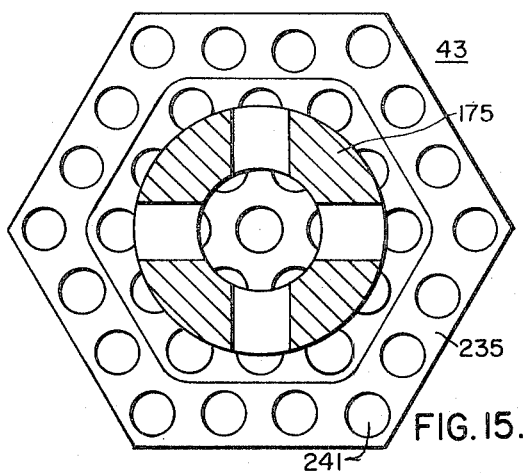
FIG. 15.

3,817,029

ROCKET ENGINE

BACKGROUND OF THE INVENTION

For space exploration and for related purposes rocket engines capable of delivering very high thrust, typically of the order of 1,000,000 pounds or more, are required. The thrust of a rocket engine is developed by the exhaust of hot propellant gas through a nozzle. To achieve the high trust nozzles made in accordance with the teachings of the prior art are large, typically in excess of 12 feet in diameter and in excess of 20 feet in length. In such nozzles the surface area in contact with the hot exhaust propellant gas is very large and this gas is severely restricted at the nozzle. It is then necessary that the propellant fluid be distributed over the nozzle, so that the nozzle is adequately cooled and remains cool while the propellant flows through it. For this purpose prior art nozzles are provided with cooling tubes and are complicated and costly. Because prior-art nozzles are very large and they cannot be effectively tested at the manufacturing site difficulty and high cost is encountered in transporting them from their manufacturing site to the site where they are used.

It is an object of this invention to overcome the above-described difficulties and disadvantages and to provide a relatively low-cost nuclear rocket engine, in which the nozzles shall be of simple low-cost construction, free of cooling mechanisms and tubes, and whose parts shall be readily effectively tested at the manufacturing site and readily transportable from the manufacturing site to the use site for assembly at the use site.

SUMMARY OF THE INVENTION

This invention arises from the realization that the complication of cooling the nozzle can be avoided or eliminated by forming the nozzle of a high-temperature refractory material capable of withstanding the temperatures of the hot propellant. Graphite and metallic carbides or borides are the most notable of such materials. Such materials are called in this application materials of the graphite type. It has also been realized that materials of the graphite type cannot be fabricated into the massive nozzles included in prior art apparatus but that such materials lend themselves to fabrication of smaller structures.

In accordance with this invention a modular rocket engine is provided. Each module of the engine includes a relatively small nuclear core and a relatively small nozzle, the core being in propellant transfer relationship with the nozzle. The dimensions of the individual nozzles of the modules are so small that these nozzles can be fabricated readily from material of the graphite type.

Typically (but not necessarily) the modules may be identical. The modules may then be separated, assembled and pre-tested at the manufacturing site and readily shipped to the use site for assembly into a rocket-engine unit.

The modules of the modular rocket engine have relatively short nozzles. The overall height of a completely assembled rocket, with an engine according to this invention, ready for launching is considerably reduced compared to rockets with prior-art engines.

BRIEF DESCRIPTION OF THE DRAWINGS

For a better understanding of this invention, both as to its organization and as to its method of operation, together with additional objects and advantages thereof, reference is made to the following description, taken in connection with the accompanying drawings, in which:

FIGS. 5A and 5B, taken together, are a view partly in side elevation with parts broken away and partly in section of a two pass module for the engine shown in FIGS. 1 and 2;

FIG. 6 is a view in section taken along line VI—VI of FIG. 5;

FIG. 7 is a view in section taken along line VII—VII of FIG. 5;

FIG. 8 is a view in section taken along line VIII—VIII of FIG. 6;

FIG. 9 is a view in section taken along line IX—IX of FIG. 5;

FIG. 10 is a view in section taken along line X—X of FIG. 5;

FIG. 11 is a view partly in side elevation and partly in section of a typical first-pass fuel element of the module shown in FIG. 5;

FIG. 12 is a view in section taken along line XII—XII of FIG. 11;

FIG. 13 is a view partly in section and partly in side elevation of a typical second-pass fuel element of the module shown in FIG. 7;

FIG. 14 is a view in section taken along line XIV—XIV of FIG. 13;

FIG. 15 is a view in section taken along line XV—XV of FIG. 13;

DESCRIPTION OF EMBODIMENTS

Figure 17:
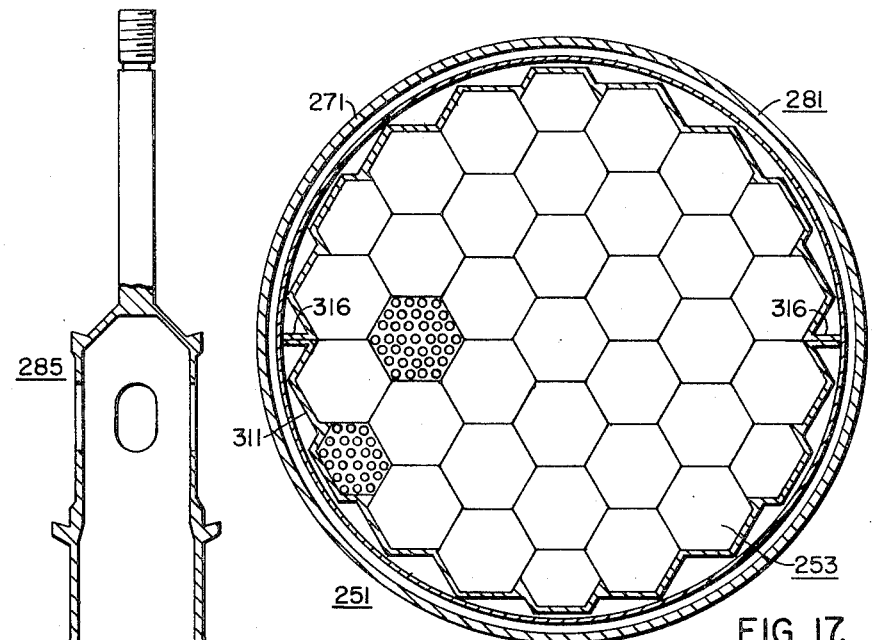
FIG. 17 is a view in section taken along line XVII—XVII of FIG. 17.
Figure 16A:
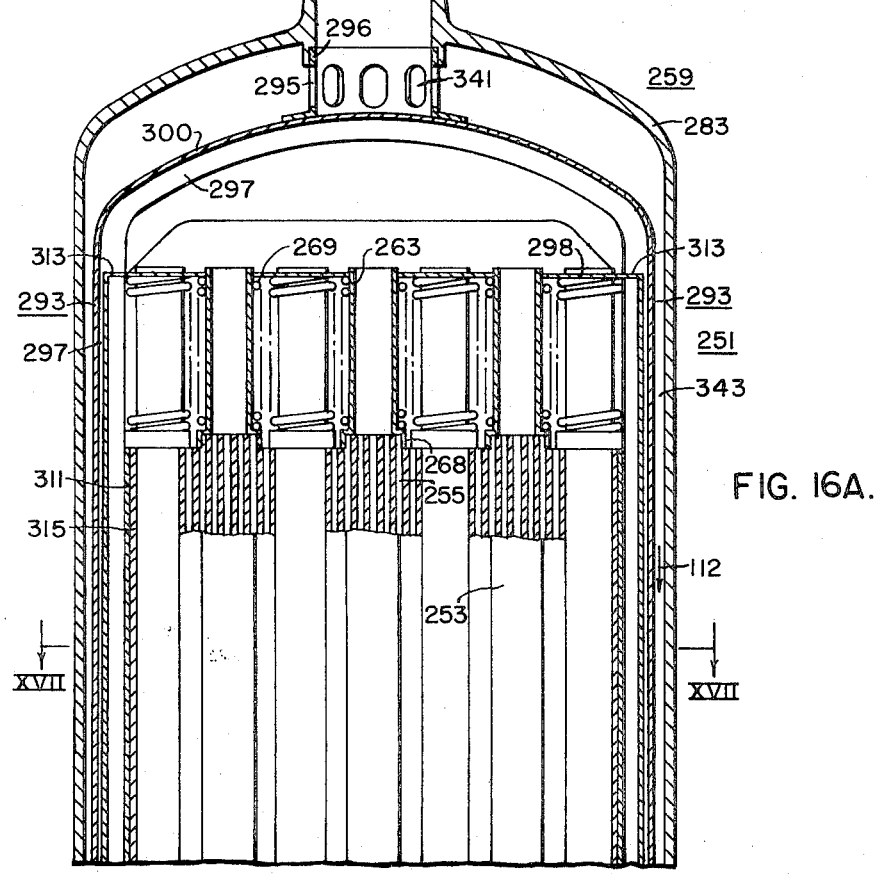
FIGS. 16A and 16B, taken together are a view partly in side elevation with parts broken away and partly in section of a one-pass module for an engine such as is shown in FIGS. 1 and 2.
Figure 16B:
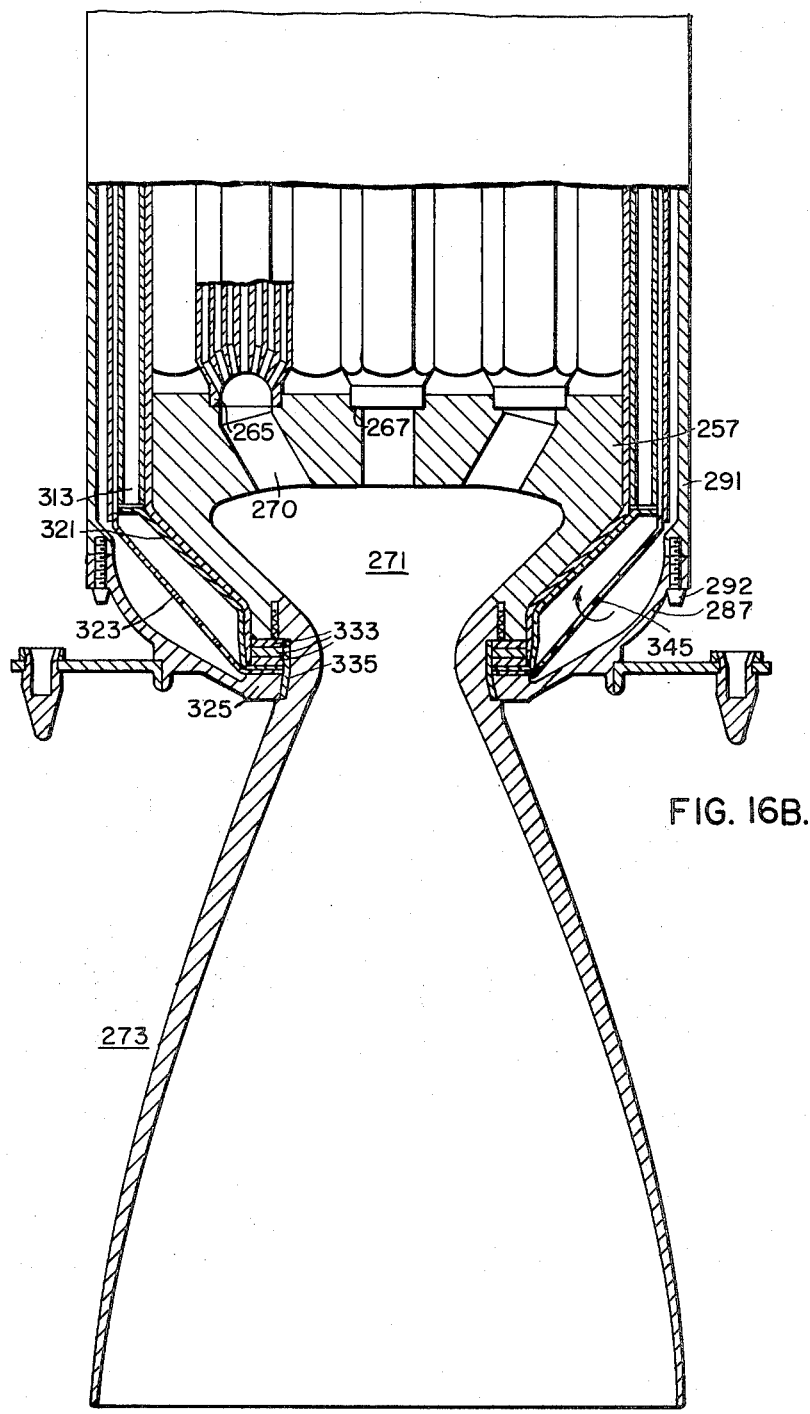

The drawings show a two-pass engine (FIGS. 1–15) and the module for a one-pass engine (FIGS. 16, 17). Typically for a one-pass module, where hydrogen is the propellant fluid, the ratio of nozzle-exit area to throat area has been found not to exceed 18 for reasonably attainable hydrogen-supply pressure, core pressure drop and fuel heat-transfer constants. This ratio is adequate for a booster engine launched from the ground but is far too low for sustaining stage engines actuated in space. For space purposes a two-pass module having a ratio of nozzle-exit area to throat area up to 36 is necessary. For a two-pass module the length of the fuel element is one-half the length for a one-pass module but there is twice the number of fuel elements in the two-pass module.

Figure 3:
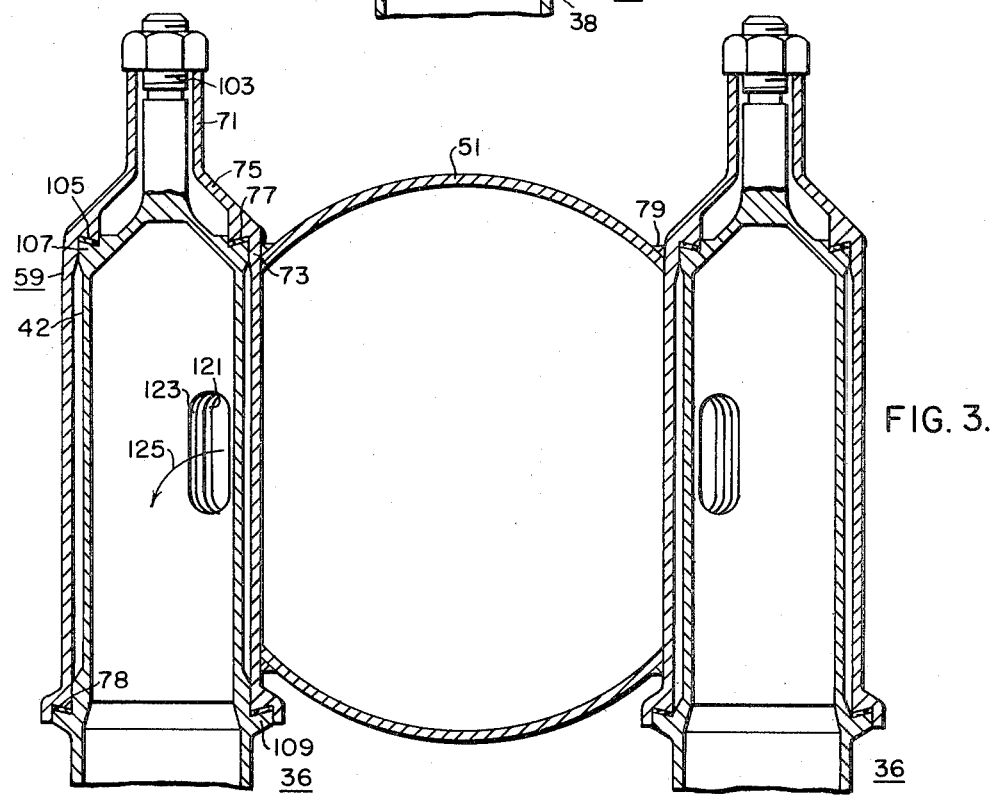
Figure 4:
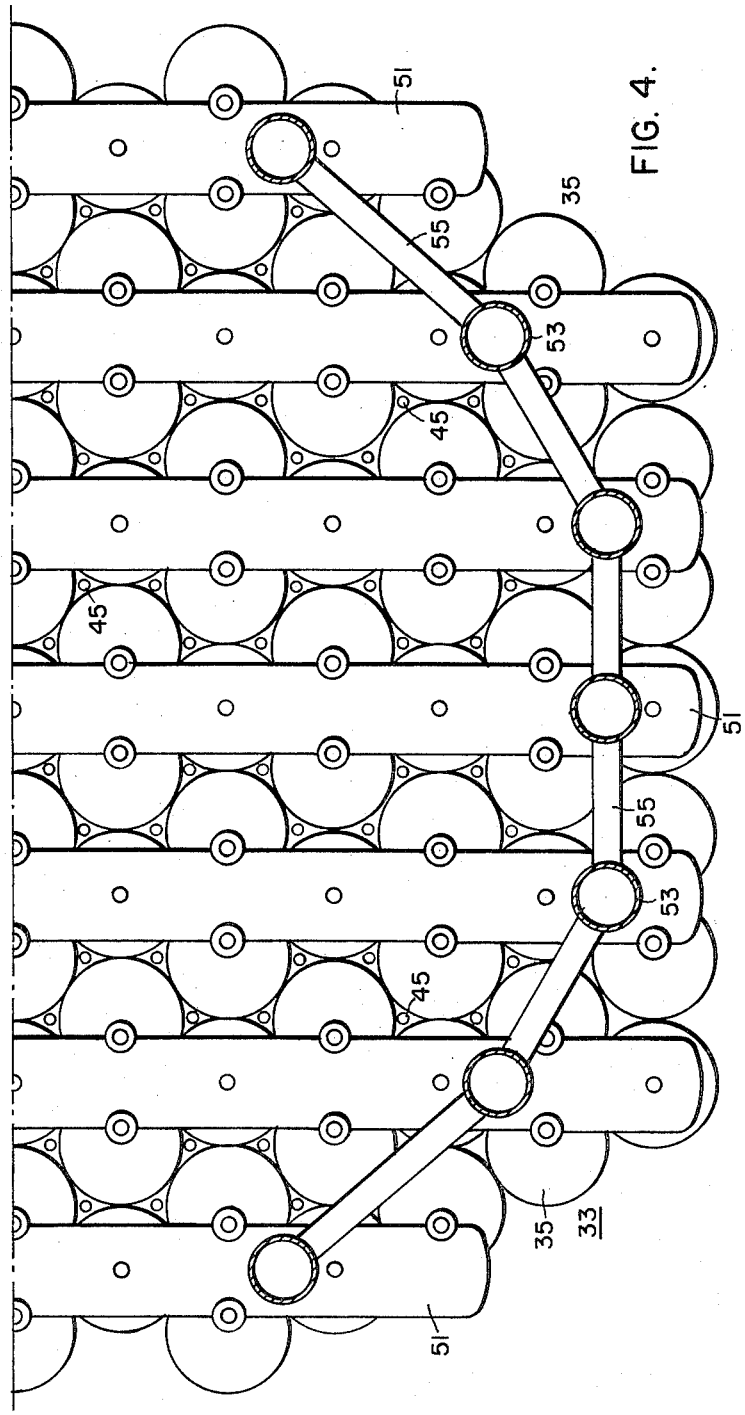
FIG. 4 is a plan view of the rocket engine shown in FIG. 1.
Figure 5B:
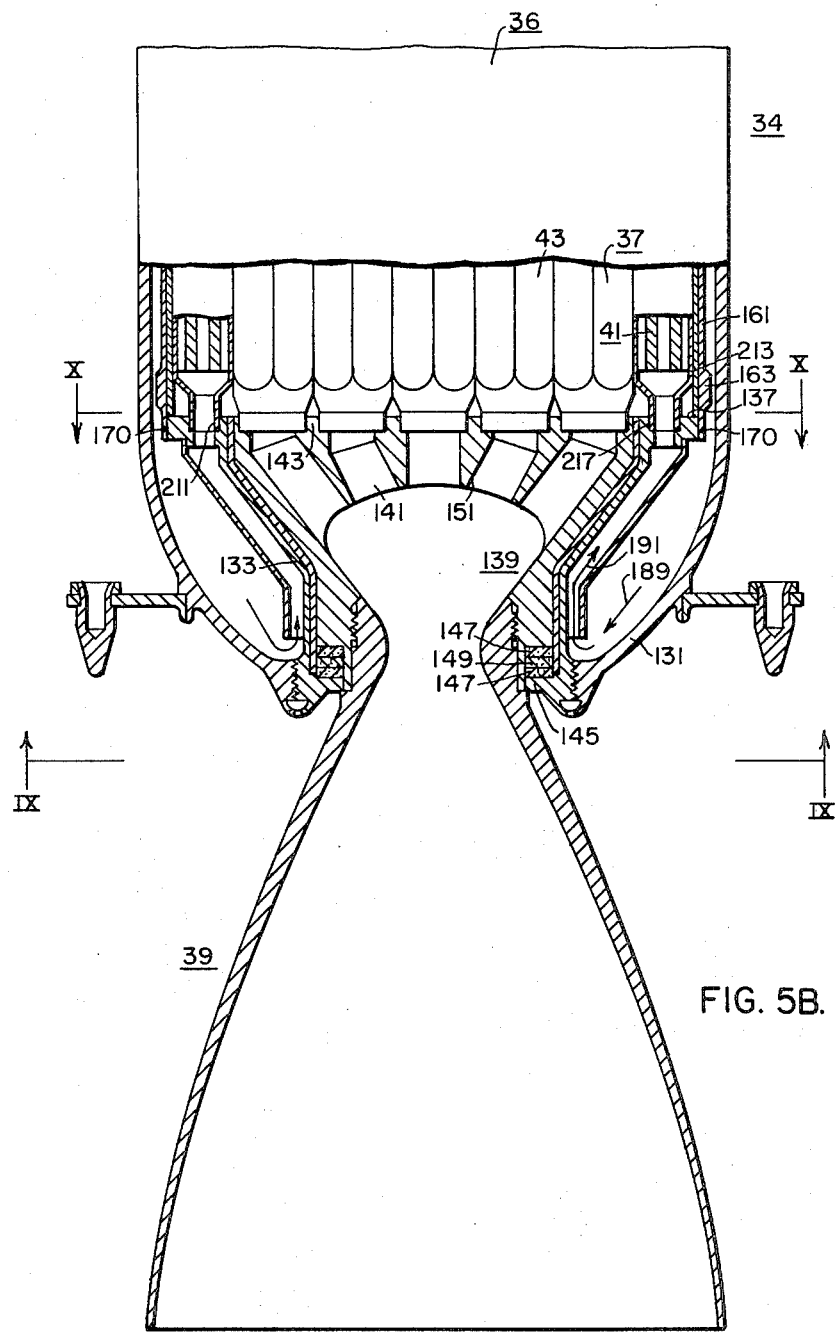

The apparatus shown in FIGS. 1 through 4 is a modular nuclear rocket engine 31. Such an engine is mounted aft of a vehicle which includes a payload (not shown) and a tank of propellant fluid (not shown) which is typically hydrogen. The engine includes a plurality of modules of the two-pass type. The modules are of two different kinds identified as 33 and 34. Each module 33 and 34 includes a pressure vessel 35 and 36, respectively. The pressure vessel 35 has an extension 38 extending centrally from its head 40; the pressure vessel 36 has an extension 42 extending to one side of its head 44. The walls of the vessels 35 and 36 are secured onto the respective heads 40 and 44 and welded by an annular omega weld 50 (FIG. 5A). There is a nuclear core 37 in each vessel 35 and 36. Each pressure vessel 35 and 36 is in communication with a nozzle 39. The individual nozzles 39 are so small that they can be readily fabricated from a material of the graphite type and require, and are free of, cooling tubes. The core 37 is of generally cylindrical form and includes first pass fuel elements 41 (FIGS. 5, 11, 12) around its periphery and second-pass fuel elements 43 (FIGS. 5, 13, 14, 15) in its interior. Typically the engine 31 may include 121 modules 33 and 34. Control rods 45 (FIG. 4) for controlling the reactivity of the nuclear power supply of the engine are movably mounted to penetrate between the modules 33 and 34 and between the modules 33.

Figure 1:
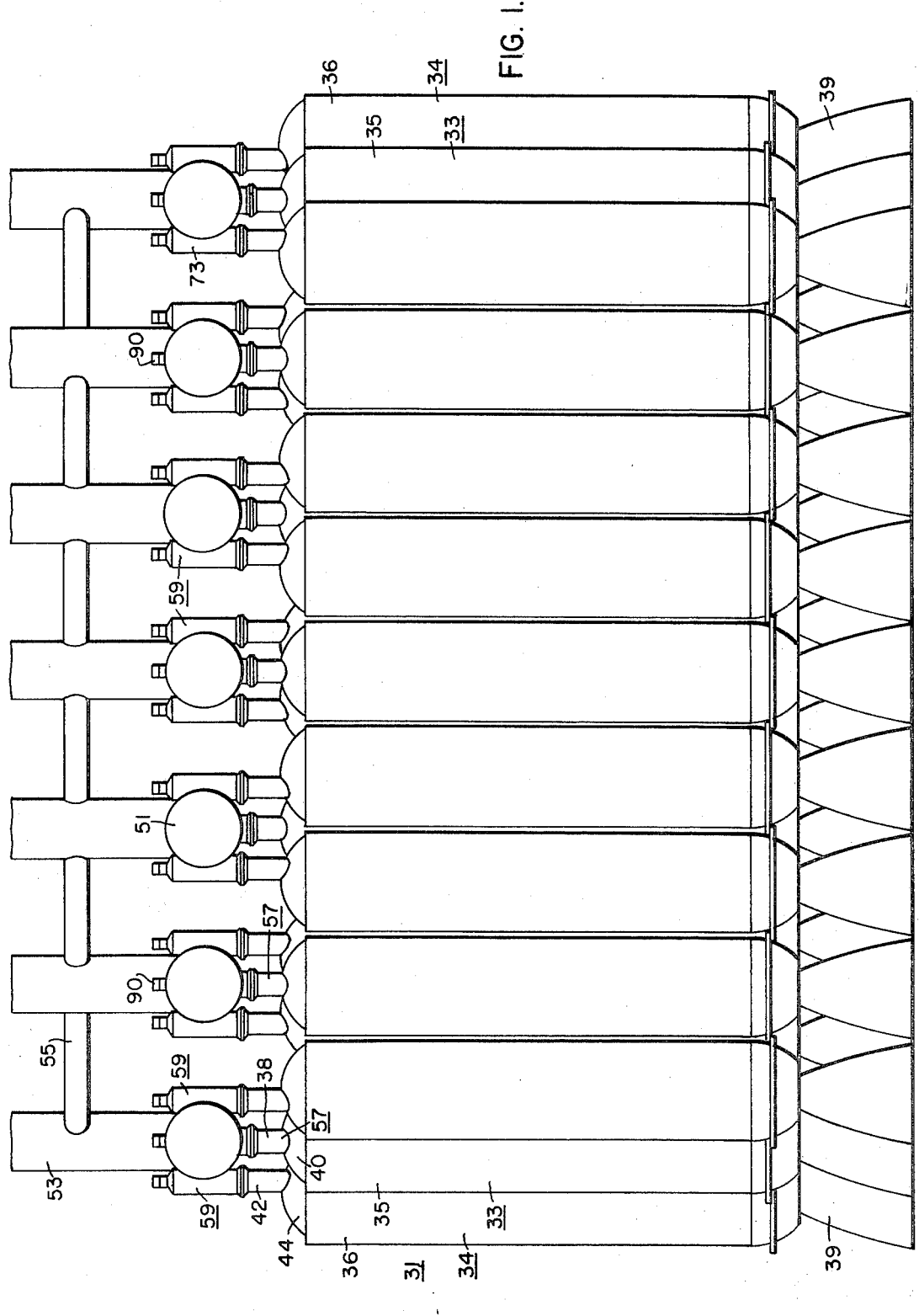
FIG. 1 is a view in side elevation of a modular, nuclear rocket-engine in accordance with this invention.
Figure 2:
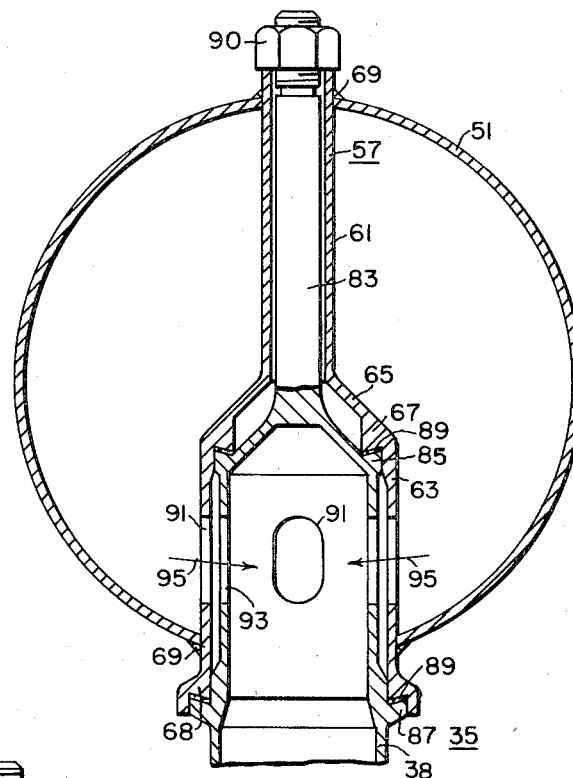
FIGS. 2 and 3 are respectively fragmental, enlarged views in section of the header assemblies of FIG. 1 and 4.

The modules are supported by headers 51 which also serve as manifolds for distributing the propellant through the cores 37 and nozzles 39. The headers 51 are supported by hollow struts 53 which are connected to the propellant tank and supply the propellant to the headers 1. The struts 53 are held together by bars 55 (FIGS. 1 and 4).

The headers 51 are penetrated by support bushings 57 (FIG. 2) and 59 (FIG. 3) for the individual modules 33 and 34, respectively. Each module 33 is supported by a bushing 57 which penetrates the center of a header 51 (FIG. 2) or two modules 34 are supported by bushings 59 on each side of a header 51 (FIG. 3).

The bushings 57 (FIG. 2) each has a long stem 61 which merges into a body 63 through a shoulder 65. Each bushing 57 has an internal ring-shaped sloping shoulder 67 near the junction of the external shoulder 65 and body 63 and another internal sloping shoulder 68 near its end. The bushing 57 is welded by circumferential welds 69 into the header 51 substantially centrally with respect to the transverse cross-section of the header 59.

The bushing 59 has a short stem 71 which merges into its body 73 through a sloping shoulder 75. The bushing 59 has an internal ring-shaped sloping shoulder 77 near the junction of the sloping shoulder 75 and the body 73 and another internal sloping shoulder 78 near its end. Bushings 59 are welded at diametrically opposite sides of the header 51 by circumferential welds 79.

The extension or stem 38 of pressure vessel 35 of each module 33 is supported in bushings 57. The extension 38 terminates in a central stud 83 threaded at its outer end. The extension 38 has external sloping shoulders 85 and 87 which mate with the internal shoulders 77 and 78, respectively. Each extension 38 is inserted into a corresponding bushing 57 from below and secured and sealed to the bushing by CONOSEAL gaskets 89. The gaskets 89 are compressed between the respective shoulders 85 and 67 and 87 and 68 by a bolt 90. The gaskets 89 are of a metal such as stainless steel. Each is of frustoconical shape having an initial angle of 34° which is compressed to 10°. This wedging action produces a very high sealing force between the shoulders 85, 67 and 87, 68 which insures 100 percent metal-to-metal contact and a practically leaktight joint. Propellant from the header 51 enters the modules 33 through matching windows 91 and 93 in the walls of bushings 57 and pressure vessel extensions 81. The arrows 95 show the direction of flow of the propellant into the pressure vessel 35 of the module 33.

The modules 34 which are supported by the bushings 59 are similar to the modules 33 supported by the bushings 57. The stem 42 of each pressure vessel 36 of each module 34 terminates in an end-threaded stud 103 and each stem 42 is sealed by CONOSEAL gaskets 105 compressed between making shoulders 107 and 77 and 109 and 78. The bushing 59 and the stem 42 have windows 121 and 123 through which propellant flows into the module in the direction of the arrow 125.

Internally modules 33 and 34 are alike and the internal structure is herein described with reference to FIG. 5 which shows a module 34 and FIGS. 12 through 15 and which show the fuel elements.

The pressure vessel 36 is tubular and, typically, is made of high strength aluminum alloy. The vessel 36 has a spherical bottom closure head 131 with a large central flanged opening. A funnel shaped adapter 133 is screwed into the flange 135. The upper rim of the adapter 133 serves as a support plate for the first-pass fuel elements 41 and is provided with shouldered holes 137 for this purpose. The adapter 133 also serves as a mounting for the second-pass fuel elements 43, support plate 139 which is typically made of graphite and which is provided with outlets 141 and locating holes 143 for these elements 43. The support plate 139 rests on a lower flange 145 of the adapter 133 from which it is insulated by graphite washers 147 and graphite cloth wrapping 149. The exhaust nozzle 39, which is of a material of the graphite type, is screwed to the support plate 139 and blends into the contour of a central cavity 151 in the support plate 139. After assembly, the adapter 133 is permanently joined to the pressure vessel by omega type seal welds 153.

The fuel elements 41 and 43 are enclosed in a thin-walled core barrel 161 with a series of strengthening rings 163 which enables the barrel 161 to withstand the pressure differential without yielding and passing against the fuel elements. The barrel 161 is insulated from the elements by graphite cloth wrappings 165 which are backed up by strips 167 of graphite (FIGS. 7 and 8) in the spaces between the elements 41. A shaped graphite ring 172 provides protection for the upper flanged part 168 of the barrel 161. The barrel 161 is brought into position from above after the fuel elements 41 and 42 have been mounted on the lower support plates 133 and 139 and have been insulated. It slips over the outer rim of the first-pass support plate 133 and is seal welded to it at 170. The upper end of the barrel is enclosed by the upper support plate 171 which also houses the hold-down springs 173 (FIG. 11) for the individual fuel elements 41 and 43. The support plate 171 which is made typically of precision cast aluminum is pressed firmly against the upper rim of the barrel 161 by bolts 174 which also compress the springs 173. A graphite plate 176 with clearance holes for the fuel element adapters 175 protects the support plate 171 against direct contact with the hot gases from the first pass elements 41. Projecting fins 177 on the support plate 171 center the barrel-assembly in the pressure vessel 36. Spacers 181 and 183 typically of graphite separate the plate 171 and the ring 176 and also the ring 176 and the ring 163.

The propellant fluid flows into each module 34 through the stem 42 and then through the opening 185 into the annulus between the pressure wall 36 and the barrel 161. Then up through the funnel-shaped flow baffle 133 up through the first-pass fuel elements 41. Then down through the second-pass fuel elements and through the nozzle 39. The arrows 187, 189, 191, 193 indicate the flow of the propellant. Typically there are in each module 34 (or 33) about 30 first-pass fuel elements 41. The propellant emerges from the top of these elements 41 with a temperature of about 2,500°F and it is further heated by passing down through, typically, about 31 second-pass elements 43.

The modules 33 and 34 are secured together at their lower ends by scrolled flanges 201 which are held together by dowell pins 203. The flanges 201 extend from the lower head 131. The first-pass fuel element 41 includes a bottom adapter 211 through which the cold propellant enters. This adapter 211 is made of aluminum or the like and has a thin hexagonal upper rim 213 which fits tightly around the end of the fuel rod 215 (FIG. 11) which has been machined down to accommodate the adapter 211 to suit. When the fuel heats up, the fit of adapter 211 and the fuel 215 becomes tighter and the joint is substantially leaktight. A tubular projection 217 of the adapter 211 serves as entrance for this cold propellant and also supports the element 41 in the first-pass support plate 133. The diameter of the projection 217 should be as small as practicable to reduce the upward thrust of the element.

The fuel rod 215 is in the form of a long extrusion of hexagonal cross-section and typically composed of a homogeneous mixture of graphite and fine uranium carbide powder. The fuel rod 215 is penetrated by a number of longitudinal holes 219 for coolant gas. The holes 219 are arranged in a triangular pattern. The holes 217 are accurately reamed to the proper dimensions.

The upper adapter 175 (FIGS. 5 and 11) is the same on both the first and second-pass fuel elements, is in contact with hot hydrogen and is made of graphite. It is recessed into the upper end of the rod 211 and is provided with flow holes 223 for the propellant. A metal bushing 225, recessed into a hole 226 in the upper cylindrical part of the adapter 175 serves as a seat for the fuel element holddown spring 173 and also as a radial positioner for the element. A ball pointed pin 227 attached to the upper support plate 171 projects into the bushing 225 and maintains the desired position of the element. The pin 227 has sufficient flexibility to permit a slight re-orientation in element position as a result of thermal expansion during operation.

The second pass fuel elements 43 have an internally dome-shaped bottom adapter 231 with a supporting stem 233 and a hexagonal upper rim 234 which engages the fuel rod 235. The adapter has converging holes 237 exiting at the dome 239 which communicates with the holes 141 (FIG. 5). The fuel rod 235 is similar to the rods 215 but the walls of its holes 241 may be lined with niobium carbide to retard corrosion by the hot propellant. The upper adapter 175 is the same as for the first pass fuel elements 41. Adapters 171 and 231 are composed of graphite or of a material of the graphite type.

In operation the propellant enters the modules cold (or even in liquid conditions). The propellant is heated to a high temperature as it flows up the elements 41 and down the elements 43. As the propellant leaves the nozzle 39 it propels the craft.

Only the module 251 for the one-pass modular nuclear rocket engine is shown (FIGS. 16, 17). The modules 251 are combined into an engine analogously to the modules 41 and 43 of the two-pass engine but are of twice the length of the two-pass modules.

In the modules 251 the fuel elements include rods 253 which are long extrusions of hexagonal cross section with holes 255 similar to the rods 215 and 235 of the two-pass engine.

The fuel rods 253 are supported between two support plates 257 and 259, the lower 257 is made of graphite while the upper is formed from thin sheet metal (aluminum) with holes 261 for the upper adapter bushings 263. The lower support plate 257 is dome-shaped and this support plate is provided with shouldered holes 265 into which the cylindrical ends of the rods 253 are inserted. During operation, pressure exerted on the shoulders 267 and also on the joint 268 between adapters and fuel rods 253 by the pressure differential across the elements 251 tends to reduce, or substantially eliminate, leakage at these points. When not in operation, partial pressure is maintained by hold-down springs 269 at the top of the modules to prevent looseness and vibration. The springs are dimensioned to accommodate the growth in length of the rods 253 caused by thermal expansion. The holes 270 in the support plate 257, are coated with niobium carbide and converge toward a central cavity 271 which blends into the contour of the outlet nozzle 273.

The module 251 has a cylindrical pressure vessel 281 made of a high-strength aluminum alloy with which the upper closure head 283 is integral. The propellant is supplied to the pressure vessel 281 through a tubular extension 285 of the closure 283; the extension 285 also serves as a means for attaching the module 251 to the upper support structure analogously to the showing of FIGS. 1 through 4. The lower closure or head 287 has a large flanged central opening 289 and is attached to the pressure vessel wall 291 by bolts 292. Inside the vessel 281 is a sheet aluminum baffle 293 supported and centered in the vessel by a permanently attached tube 295 at the top which extends into a shallow recession 296 in the closure head 283. The baffle 293 is held in this position by the force of the fuel-rod hold-down springs 269 which is transferred by a spring-retaining plate 298 to the reinforcement ribs 297 of the baffle closure 300. At the lower end, the baffle 295 is centered with a sliding fit on a conical baffle guide 299 which is held in position by clamping to the lower enclosure flange 301.

A corrugated sheet aluminum barrel 311 with thin bolting flanges 313 at each end encloses the fuel elements 251. The corrugations follow the outline of the elements, but are separated from the elements by a layer of graphite cloth 315 which serves as thermal insulation. The barrel 311 is made in three parts joined by closely spaced rivets 316 to form a reasonably leaktight enclosure. Because of the corrugations 317, the barrel 311 possesses considerable flexibility and is forced against the fuel element 251 by the differential pressure and also accommodates the thermal expansion of the fuel elements at maximum temperature. The lower end of the barrel 311 is supported by bolting to a funnel shaped extension 321 which together with the baffle guide 323 is clamped between the pressure vessel closure flange 325 and the lower support plate 257. The clamping pressure, as mentioned previously, is provided by the module pressure drop and the holddown springs 269. Three serrated graphite washers 331 and graphite cloth wrappings 353 insulate the support plate 257 from the metal parts. The exhaust nozzle 273 is screwed into the support plate 257. The upper end of the support barrel 311 is attached to the spring retaining plate 259 by bolting which permits limited axial movement of the plate, necessary to transfer the spring load to the baffle closure and insure its seating.

Propellant enters the pressure vessel 281 at the top and is directed through openings 341 in the baffle support tube 295 to the annular space 343 between baffle 293 and pressure vessel wall 291. It flows downward in this space, reverses its direction and flows upward in the space between core barrel 311 and baffle which it enters through hole 345 in the lower baffle guide. After reaching the top of the barrel enclosure the propellant again flows downward through the rod flow holes 295 where it is heated, and finally emerges at high temperatures through the exhaust nozzle 273.

While several embodiments of this invention have been disclosed herein modifications thereof are feasible. This invention then is not to be restricted except insofar as is necessitated by the spirit of the prior art.

I claim as my invention:

1. A nuclear rocket engine comprising a plurality of modules, each module including a reactor core including at least one fuel element including nuclear fuel, each fuel element having fluid passageways therein, a nozzle in propellant fluid receiving relationship with each core, manifold means flow coupled to each module in parallel for conducting said fluid in parallel paths to said cores, means connecting said modules together in coextending relationship to form a rocket-engine unit, and means connected to said manifold means for supplying propellent fluid thereto.

2. The engine of claim 1 including a plurality of struts, the modules of the rocket-engine unit being suspended from said struts and said struts also conducting the propellant fluid.

3. The engine of claim 1 including a plurality of said manifold means, each manifold means supporting a plurality of said modules of the rocket-engine unit and conducting propellant fluid to said last-named modules, and a plurality of struts supporting each manifold means and supplying said fluid to said manifold means.

4. The engine of claim 1 wherein the nozzle of each module is composed of a material of the graphite type and is devoid of nozzle cooling means.

5. The engine of claim 1 wherein the connecting means includes a flange on each module, adjacent modules being mutually mechanically interlocked together through said flanges.

6. The engine of claim 1 including control rods for controlling the nuclear reactivity of the rocket-engine unit interposed between the modules but external to the modules.

7. The engine of claim 1 wherein the modules include housing means and wherein the interior of each housing means is flow isolated from the interior of other housing means at coextending portions thereof.

8. The engine of claim 1 wherein a plurality of additional first pass module means are positioned in the flow path intermediate said manifold means and said modules, said additional module means each having a flow path and an inlet and an outlet, said inlets being flow coupled in parallel to said manifold means and the outlets of said additional modules being flow coupled in parallel to said modules.

9. The engine of claim 8 wherein said additional first pass module means being coextending with said modules and being located peripherally of said rocket-engine unit.

10. The engine of claim 6 wherein each reactor core contains less nuclear fuel than that required to produce a controlled, sustained chain reaction.

* * * * *